United States Patent
Pandey et al.

(10) Patent No.: US 12,547,684 B2
(45) Date of Patent: Feb. 10, 2026

(54) INTEGRATING REAL-WORLD AND VIRTUAL-WORLD SYSTEMS

(71) Applicant: Bank of America Corporation, Charlotte, NC (US)

(72) Inventors: Anushka Pandey, Chennai (IN); Rajat Singla, Noida (IN); Siva Kesava, Anantapur (IN); Praveen Kumar Parsa, Siddipet (IN); Murugan Vasudevan, Coimbatore (IN); Krithika Viswanathan, Chennai (IN); Amit Mishra, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 590 days.

(21) Appl. No.: 18/049,860

(22) Filed: Oct. 26, 2022

(65) Prior Publication Data
US 2024/0143709 A1 May 2, 2024

(51) Int. Cl.
G06F 21/00 (2013.01)
G06F 21/31 (2013.01)

(52) U.S. Cl.
CPC .................................. G06F 21/31 (2013.01)

(58) Field of Classification Search
CPC ...................................................... G06F 21/31
See application file for complete search history.

(56) References Cited

U.S. PATENT DOCUMENTS

| | | | |
|---|---|---|---|
| 8,082,297 B2 | 12/2011 | Syvain et al. | |
| 8,631,417 B1 | 1/2014 | Mendes Da Costa et al. | |
| 9,165,426 B2 | 10/2015 | Jones et al. | |
| 9,342,211 B2 | 5/2016 | Deluca et al. | |
| 10,326,667 B2 | 6/2019 | Jones et al. | |
| 10,587,584 B2 | 3/2020 | Vikramaratne et al. | |
| 10,610,787 B2 | 4/2020 | Hamilton, II et al. | |
| 10,931,650 B1 | 2/2021 | Mccown et al. | |
| 10,981,069 B2 | 4/2021 | Kawachiya et al. | |
| 11,170,003 B2 | 11/2021 | Wu et al. | |
| 12,273,333 B2 * | 4/2025 | Agrawal | H04L 63/08 |
| 12,278,902 B1 * | 4/2025 | Dave | G06V 40/20 |
| 2006/0178967 A1 * | 8/2006 | Jung | A63F 13/12 705/35 |
| 2006/0224505 A1 * | 10/2006 | Jung | G06Q 20/10 705/39 |
| 2007/0254631 A1 | 11/2007 | Spooner | |
| 2010/0250383 A1 | 9/2010 | Frazier et al. | |
| 2011/0072367 A1 | 3/2011 | Bauer | |

(Continued)

*Primary Examiner* — Jeffrey C Pwu
*Assistant Examiner* — Helai Salehi

(57) ABSTRACT

A system includes a memory and a processor coupled to the memory. The processor receives a user credential associated with a first user and authorizes an avatar of the first user to enter a virtual environment. When the first user is registered with a first entity, the processor obtains a user profile of the first user. Based on the user profile, the processor determines and indicates to the first user in the virtual environment that a first type of data file of the first user qualifies the first user to obtain a product or service for a first amount of data objects. The processor receives a selection of the product of service from the first user, receives a command to transfer the first amount of data objects from the first type of data file to a second data file, and transfers the first amount to the second data file.

20 Claims, 4 Drawing Sheets

(56) References Cited

U.S. PATENT DOCUMENTS

| | | |
|---|---|---|
| 2014/0026078 A1 | 1/2014 | Dawson et al. |
| 2018/0104595 A1 | 4/2018 | Kawachiya et al. |
| 2018/0123816 A1 | 5/2018 | Tandon et al. |
| 2020/0338458 A1 | 10/2020 | Huang et al. |
| 2021/0042748 A1 | 2/2021 | Sepulveda et al. |
| 2024/0028675 A1* | 1/2024 | Merdassa ................. G06F 21/31 |
| 2024/0152597 A1* | 5/2024 | Suzuki ................... A61B 34/30 |

* cited by examiner

US 12,547,684 B2

INTEGRATING REAL-WORLD AND VIRTUAL-WORLD SYSTEMS

TECHNICAL FIELD

The present disclosure relates generally to network communication, and more specifically to integrating real-world and virtual-world systems.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to securely access a virtual environment and perform secure data interactions in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, and other data interactions performed in real-world and virtual environments. For example, user information collected from the user and/or assigned to the user in a real-world environment may be used in a virtual environment (e.g., metaverse environment) to authenticate the user before allowing the user to access the virtual environment and perform any kind of action or interaction within the virtual environment. Additionally or alternatively, as described in embodiments of the present disclosure, user information collected from the user and/or assigned to the user in the real-world environment may be used in the virtual environment (e.g., metaverse environment) to provide access to products or services within the virtual environment. This process provides improved information security because it authenticates that an avatar is associated with the user and not an unauthorized party and that the user is authorized to access the virtual environment, and products/services provided in the virtual environment.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the need to store the same data (e.g., authentication data, login credentials, etc.) in both systems, as data stored in one system can be accessed, or otherwise leveraged, by the other system. This saves memory resources by avoiding duplication of data. The saving of memory resources may leave more system memory for storing other data used in other technical operations. This provides the additional technical advantage of improving processing efficiency of computing systems that manage the real-world and virtual word environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
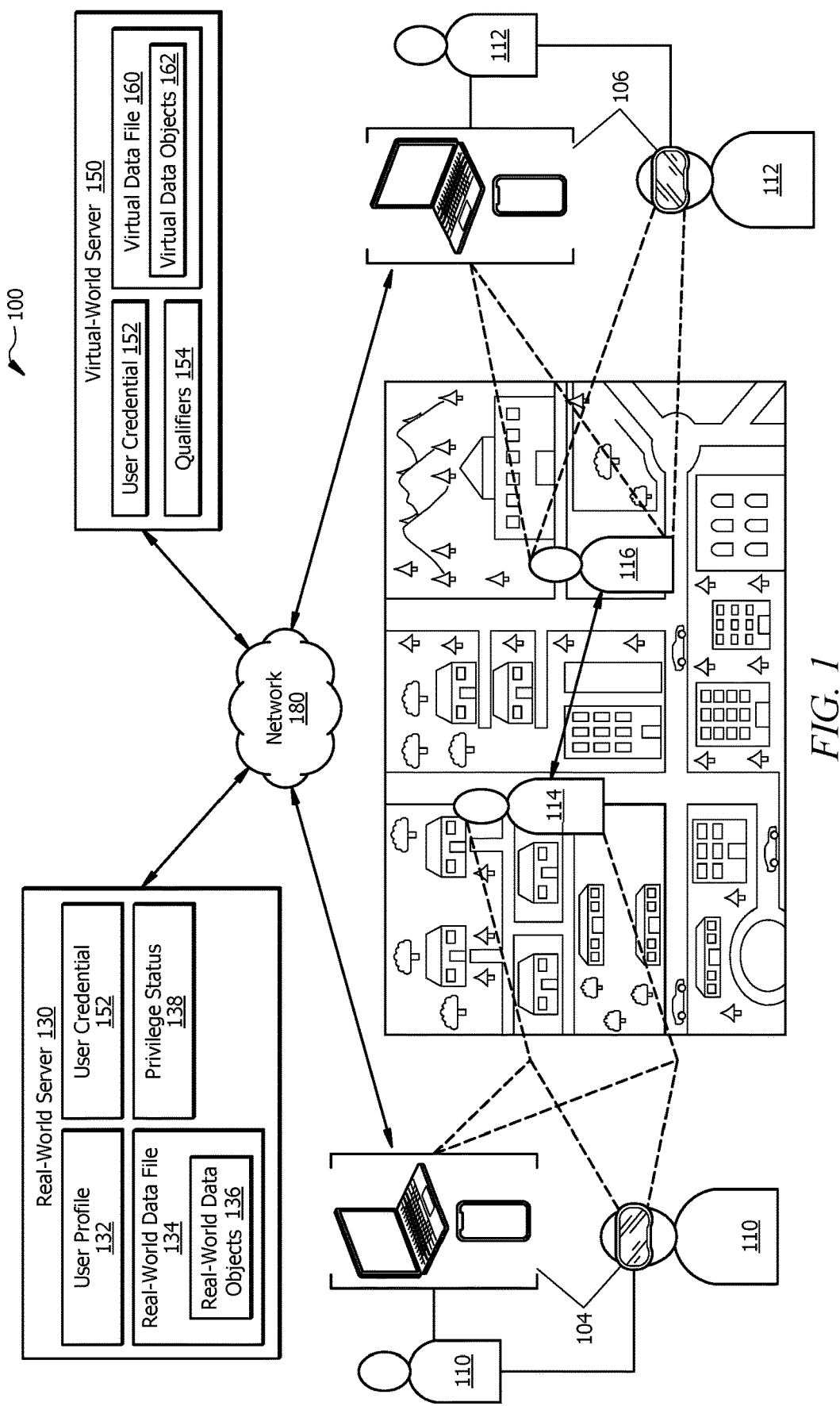
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and virtual-world server 150 each connected to a network 180. A first user 110 is associated with the first user device 104 and a second user 112 is associated with the second user device 106. The system 100 may be communicatively coupled to the communication network 180 and may be operable to transmit data between each one of the first user device 104, second user device 106, real-world server 130, and virtual-world server 150 through the communication network 180.

In general, the system 100 may improve interoperability of real-world systems and virtual world systems (e.g., metaverse systems) so that information may be seamlessly shared between these systems to implement data security, authorization of data interactions, and other data interactions performed in real-world and virtual environments. For example, user information collected from the user and/or assigned to the user in a real-world environment may be used in a virtual environment 102 (e.g., metaverse environment) to authenticate the first user 110 before allowing the first user 110 to access the virtual environment 102 and perform any kind of action or interaction within the virtual environment 102. Additionally or alternatively, as described in embodiments of the present disclosure, user information collected from the first user 110 and/or assigned to the first user 110 in the real-world environment may be used in the virtual environment 102 (e.g., metaverse environment) to provide the first user 110 access to products and/or services within the virtual environment 102. This process provides improved information security because it authenticates that a first avatar 114 is associated with the first user 110, not an unauthorized party, and that the first user 110 is authorized to access the virtual environment 102, obtain products and services within the virtual environment 102 and perform data interactions.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any user (e.g., second user 112) connected to network 180.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities through a respective avatar. For example, the second user 112 may attempt to engage in an interaction session with the first avatar 114 through a second avatar 116 associated with the second user 112. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 occurs, the virtual-world server 150 may authenticate that the first avatar 114 is associated with the first user 110 and not an unauthorized third-party. For example, the first user 110 may be required to sign into a secure portal that provides access to a data file (e.g., real-world data file 134 and/or virtual data file 160) associated with the first user 110. As shown in FIG. 1, the real-world data file 134 of the first user 110 is stored and managed by the real-world server 130 and the virtual data file 160 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160 and/or the real-world data file 134. The virtual data file 160 and the real-world data file 134 may include virtual data objects 162 and real-world data objects 136 respectively owned by the first user 110. The real-world server 130 and the virtual-world server 150 may store other information related to the first user 110 including, but not limited to, user identity information (e.g., name, address, phone numbers, social security number etc.), account information (e.g., including identity and other details relating to the respective data files 134 and 160), avatar information (e.g., configuration of first avatar 114), digital assets (e.g., respective real-world data objects 136 and virtual data objects 162) information, or any other suitable type of information that is associated with a user within the virtual environment 102 and/or the real-world environment.

Each of the real-world server 130 and the virtual-world server 150 is generally a suitable server (e.g., including a physical server and/or virtual server) operable to store data in a memory and/or provide access to application(s) or other services. One or both of the real-world server 130 and the virtual-world server 150 may be a backend server associated with a particular entity (e.g., organization) that facilitates conducting interactions between entities and one or more users. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 180 may facilitate communication within the system 100. This disclosure contemplates the communication network 180 being any suitable network operable to facilitate communication between the first user device 104, second user device 106, real-world server 130 and the virtual-world server 150. Communication network 180 may include any interconnecting system capable of transmitting audio, video, signals, data, messages, or any combination of the preceding.

Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130 and/or virtual-world server 150), databases, etc. through the communication network 180. Each of the user devices may be configured to perform specific functions described herein and interact with one or both of real-world server 130 and the virtual-world server 150, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
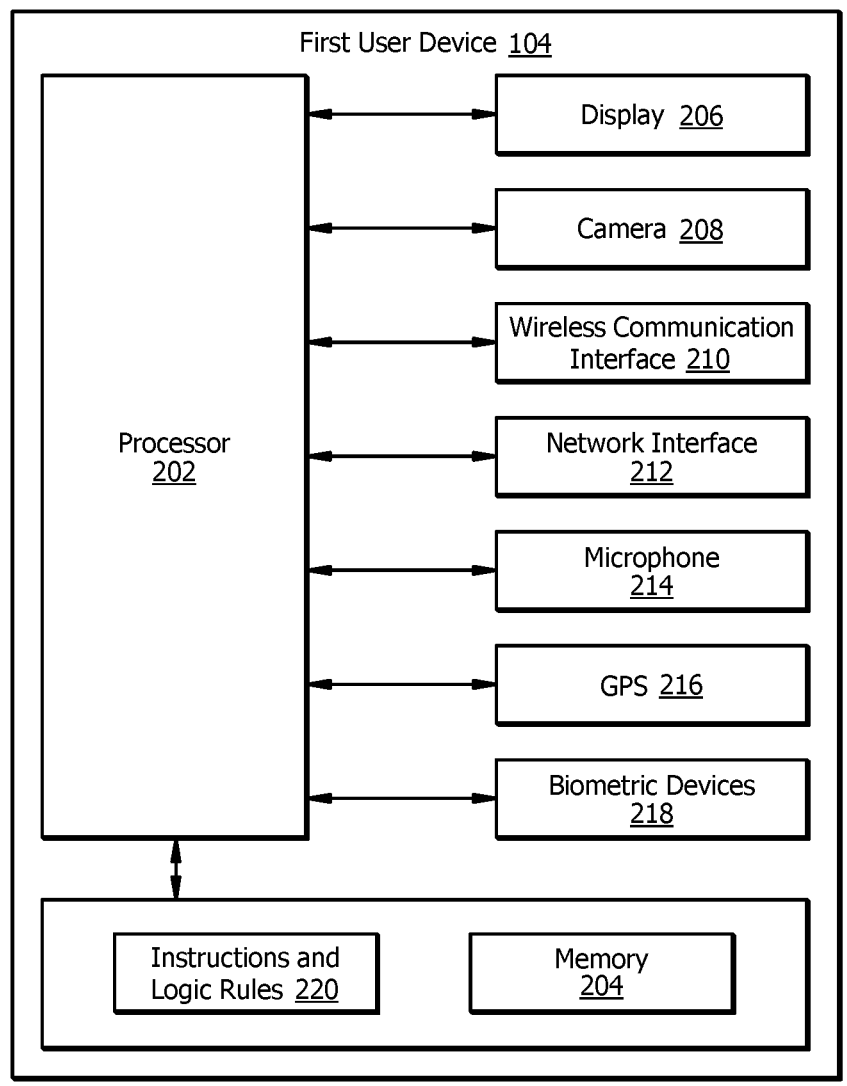
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1) or between the first user 110 and an entity (e.g., represented by a virtual entity in the virtual environment 102).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
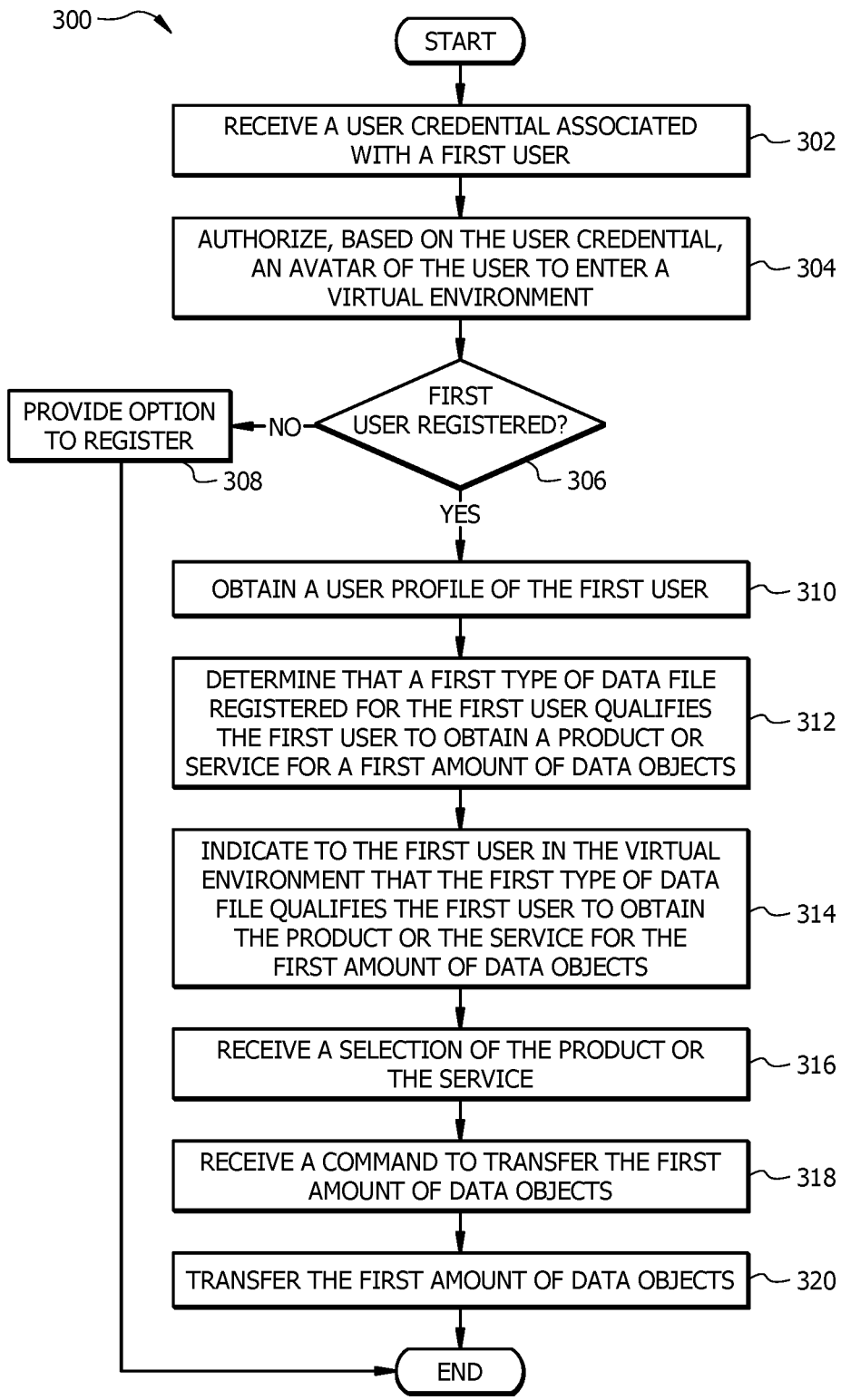
FIG. 3 illustrates a flowchart of an example method for performing data interactions in a virtual environment, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user profile 132), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. For example, second user 112 may be a representative of the entity or organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). When the real-world server 130 and the virtual-world server 150 are owned and/or operated by particular entity or organization (e.g., are part of the IT infrastructure of the entity or organization), being registered with the real-world server 130 and the virtual-world server 150 may also be interpreted as being registered with the particular entity or organization. In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by real-world server 130 as part of user profile 132 of the first user 110. In one embodiment, at least a portion of the user profile 132 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 134 for the first user 110 in which the first user 110 may store real-world data objects 136 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 134 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be asked to provide information necessary to verify the identity of the first user 110 and register the first user 110 with the real-world server 130.

Information relating to the real-world data file 134 of the first user 110 may be stored as part of the user profile 132 of the first user 110. This information may include, but is not limited to, an identity (e.g., unique name or number) of the real-world data file 134, amount of real-world data objects 136 stored in the real-world data file 134, a log of data interactions conducted in relation to the real-world data file 134 and any other information relating to the real-world data file 134.

Once registered with the real-world server 130, the real-world server 130 may allow the first user 110 to perform one or more data interactions in the real-world environment. For example, a real-world data interaction may include transferring one or more real-world data objects 136 from the real-world data file 134 of the first user 110 to a second real-world data file (not shown) of the second user 112 or another entity. Another example data interaction may include receiving one or more real-world data objects 136 in the real-world data file 134 of the first user 110 from the second real-world data file of the second user 112 or another entity. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user profile 132 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may provide the first user 110 an option to additionally register with the virtual-world server 150 which may allow the first user 110 to perform data interactions in the virtual environment 102. Registration with the virtual-world server 150 may include generating a user credential 152 that allows the first user 110 to sign on to the virtual-world server 150 and enter the virtual environment 102 via first avatar 114 of the first user 110. Once registered with the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 134 of the first user 110. For example, the virtual data file 160 is a virtual image of the real-world data file 134, wherein the virtual data objects 162 correspond to the real-world data objects 136. In other words, the virtual data file 160 is a virtual representation of the real-world data file 134. In another example, the virtual data file 160 stores a portion of the real-world data objects 136 in the form of virtual data objects 162. In another example, real-world data objects 136 may be converted to virtual data objects 162, and vice versa. In this case, there may not be a one-to-one conversion between the real-world data objects 136 and virtual data objects 162. For example, one real-world data object 136 may be converted to a plurality of virtual data objects 162, wherein the conversion ratio may dynamically change from time to time.

Information relating to the virtual data file 160 of the first user 110 may be stored by the virtual-world server 150. This information may include, but is not limited to, an identity of the virtual data file 160, amount of virtual data objects 162 stored in the virtual data file 160, a log of virtual data interactions conducted in the virtual environment 102 in relation to the virtual data file 160 and any other information relating to the virtual data file 160.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112 or another entity. Another example data interaction may include receiving one or more virtual data objects 162 in the virtual data file 160 of the first user 110 from the second virtual data file of the second user 112 or another entity. Another example data interaction may include requesting by the first user 110 transfer of virtual data objects from a data file of a second user to a data file of a third user as part of satisfying an agreement between the first user 110 and the third user.

In one or more embodiments, the virtual data file (e.g. virtual data file 160) is a software application running on a computing node owned and/or operated by the respective user (e.g., first user 110). For example, when the first user 110 desires to receive virtual data objects 162 from a virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 180.

Data security is important in any system that supports online data interactions between computing nodes of the system. Online data interactions in real-world environments have existed for several decades and robust measures are already in place to ensure data security in real-world systems. However, virtual-world technology (e.g., metaverse technology) is relatively new and data security is a challenge in metaverse systems as the development of metaverse related technologies is still at a nascent stage and standardized systems that provide robust data security are not yet in place.

Embodiments of the present disclosure leverage user data collected and/or assigned in a real-world environment for providing data security in a metaverse environment. In general, embodiments of the present disclosure describe techniques that improve interoperability of real-world systems and virtual world systems (e.g., metaverse systems) so that information may be seamlessly shared between these systems to implement data security and other data interactions performed in real-world and virtual environments. In one or more embodiments, the system and methods discussed herein use information stored in a user profile 132 of the first user 110 generated during real-world data interactions with the first user 110 to allow the first user 110 to securely obtain products and/or services in the virtual environment 102.

In one or more embodiments, virtual-world server 150 may be configured to use a user credential 152 collected from the first user 110, generated by the first user 110 or assigned to the first user 110 during real-world data interactions with the first user 110, to verify identity of the first user 110 in the virtual environment 102. Thus, the user credential 152 provides the first user 110 access to the virtual environment 102. For example, the user credential 152 may be used by the virtual-world server 150 to verify that the first avatar 114 belongs to and is controlled by the first user 110.

In one example, user credential 152 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the user credential 152) as part of registering with the real-world server 130 and use the separate user credential to log into the real-world server 130 and perform real-world data interaction. The first user 110 may separately generate user credential 152 as part of registering with the virtual-world server 150 (e.g., during a real-world data interaction with the real-world server 130). Once the first user 110 has registered with the virtual-world server 150 and generated the user credential 152, the first user 110 may use the user credential 152 to log into the virtual-world server 150 and perform virtual-world data interactions. The user credential 152 of the first user 110 may be associated with the user profile 132 of the first user 110.

In one embodiment, a second user 112 may gain access to the virtual-world server 150 and enter the virtual environment 102 without registering with the virtual-world server 150 and/or real-world server 130. In other words, virtual-world server 150 may allow the second user 112 to enter the virtual environment 102 as a guest user. For example, in order to enter the virtual environment 102 as a guest user, second user 112 may need to complete a simple verification process that may include verifying the identity of the second user 112 (e.g., using email verification, text verification etc.) and setting up a temporary avatar (e.g., second avatar 116) to navigate the virtual environment 102. In one embodiment, if the identity of the second user 112 is successfully verified, virtual world server 150 may generate a temporary user credential 152 which the second user 112 may use to access the virtual environment 102 as a guest user. It may be noted that, a guest user who is not registered with the real-word server 130 or virtual-world server 150 may not have access to the full array of products and/or services provided by the respective real-word server 130 or virtual-world server 150. For example, as further described below, the guest user may not be eligible for certain qualifiers 154 for which registered users may be eligible.

When a user (e.g., first user 110 or second user 112) gains access to the virtual-world server 150 using user-credential 152 and enters the virtual environment 102 (e.g., using first avatar 114 or second avatar 116), virtual-world server 150 may be configured to determine whether the user is registered with an entity that is associated with the virtual-world server 150 and the real-world server 130. In this context, the entity may own and/or operate the real-world server 130 and the virtual-world server 150. Being registered with the entity associated with the virtual-world server 150 and the real-world server 130 may include being registered with the virtual-world server 150, the real-world server 130, or both. As described above, a first user 110 may be registered with the real-world server 130 and maintain a real-world data file 134 at the real-world server 130. Similarly, the first user 110 may be registered with the virtual-world server 150 and maintain a virtual data file 160 at the virtual-world server 150.

The virtual-world server 150 may determine whether the user (e.g., first user 110 or second user 112) is registered with the real-world server 130 and/or the virtual-world server 150 based on user credential 152 the user used to gain access to the virtual-world server 150 and enter the virtual environment 102. For example, the user credential 152 of the user may be associated with a user profile 132 of the user that was created when the user first registered with the real-world server 130 and/or the virtual-world server 150. In an embodiment, virtual-world server 150 checks whether the user credential 152 that was used by the user to enter the virtual environment 102 is associated with a user profile 132 of the user stored at the real-world server 130 and/or at the virtual-world server 150. If a user profile 132 exists, virtual-world server 150 determines that the user is registered with the entity associated with the real-world server 130 and the virtual-world server 150. For example, a first user 110 may enter the virtual environment 102 using user credential 152. In response, virtual-world server 150 may determine that the user credential 152 is associated with user profile 132 of the first user 110 stored at the real-world server 130. In one embodiment, virtual-world server 150 may lookup the real-world server 130 for the user profile 132 associated with the user credential 152 of the first user 110. Upon detecting the user profile 132 of the first user 110 at the real-world server 130, virtual-world server 150 may determine that the first user 110 is registered with the entity that owns and/or operates the real-world server 130 and/or the virtual world server 150.

Upon determining that a first user 110 is registered with the real-world server 130 and/or the virtual-world server 150, the virtual-world server 150 may be configured to obtain the user profile 132 of the first user 110 that is associated with the registration of the first user 110 with the real-world server 130 and/or the virtual-world server 150. For example, based on the user credential 152 of the first user 110, virtual-world server 150 may request the real-world server 130 for the user profile 132 associated with the first user 110. In response, real-world server 130 may transmit the user profile 132 of the first user 110 to the virtual-world server 150. The user profile 132 associated with the first user 110 may include information relating to one or more real-world data files 134 of the first user 110 stored at the real-world server 130. The real-world data file 134 of the first user 110 may be of one of a plurality of types of real-world data files. One or more types of real-world data files may qualify the first user 110 to obtain a product or service provided in the virtual environment 102 for a pre-selected amount of data objects (e.g., real-world data objects 136 or equivalent virtual data objects 162). In one embodiment, a particular type of real-world data file 134 of the first user 110 may qualify the first user 110 to obtain a product or service for a first amount of data objects that is less than a second amount of respective data objects required to obtain the same product or service by a second user 112 who is not registered with the real-world server 130 and/or the virtual-world server 150 and/or does not have the same type of real-world data file stored at the real-world server 130. In other words, the virtual-world server 150 provides motivation in relation to obtaining certain products or services in the virtual environment 102 to users who are registered with the real-world server 130 and have a particular type of real-world data file stored at the real-world server 130. These motivations provided to the user may be referred to as qualifiers 154. Different types of real-world data files 134 may be associated with a different set of qualifiers 154, wherein each qualifier may provide a different motivation to the first user 110 in relation to a product or service in the virtual environment 102. For example, a first type of real-world data file 134 may be associated with a first set of qualifiers that provide a first set of motivations and a second type of real-world data file 134 may be associated with a second set of qualifiers that provide a second set of motivations. In one embodiment, a first qualifier associated with a first type of real-world data file 134 may qualify the first user 110 to obtain a product or service for a first amount of data objects, while a second type of real-world data file 134 may qualify the first user 110 to obtain the same product or service for a second amount of data objects that is less than the first amount of data objects. The motivation provided by a qualifier 154 towards a product or service may be pre-negotiated between a first entity that operates the real-world server 130 and second entity that provides the product or service.

In certain embodiments, one or more types of real-world data files may be associated with different privilege statuses 138. For example, a first type of real-world data file 134 may be associated with a first privilege status 138 and a second type of real-world data file 134 may be associated with a second privilege status 138, wherein the first privilege status 138 may be higher than the second privilege status 138. A privilege status 138 associated with a real-world data file 134 decides a quality of qualifiers 154 and corresponding motivations the first user 110 qualifies for in the virtual-world environment 102, wherein a higher quality of qualifiers 154 and corresponding motivations are associated with a real-world data file 134 having a higher privilege status 138. For example, a first real-world data file 134 of the first user 110 having a first privilege status 138 may be associated with a first qualifier 154 that qualifies the first user 110 to obtain a product or service within the virtual environment 102 for a first amount of data objects (e.g., real-world data objects 136 or virtual data objects 162). On the other hand, a second real-world data file 134 of the first user 110 having a second lower privilege status 138 than the first privilege status may be associated with a second qualifier that qualifies the first user 110 to obtain the same product or same service within the virtual environment 102 for a second amount of data object (e.g., real-world data objects 136 or virtual data objects 162) that is higher than the first amount of data objects. A privilege status 138 may be assigned to a particular real-world data file 134 based on one or more factors including, but not limited to, a length of time the real-world data file 134 has been maintained at the real-world server 130, and amount of real-world data objects 136 stored in the real-world data file 134 and data interaction history associated with the real-world data file 134. For example, the longer the real-world data file 134 has been maintained at the real-world server 130, the higher is the privilege status 138 assigned to the real-world data file 134. In another example, a higher average amount of real-world data objects 136 maintained in the real-world data file 134 results in a higher privilege status 138 being assigned to the real-world data file 134.

After obtaining the user profile 132 of the first user 110, virtual-world server 150 determines, based on the user profile 132, that the first user 110 has real-world data file 134 registered and stored at the real-world server 130 and further determines the type and/or privilege status 138 of the real-world data file 134. Based on the determined type of the real-world data file 134 and/or the privilege status 138 of the particular type of the real-world data file 134, virtual-world server 150 determines a set of qualifiers 154 associated with the real-world data file 134 that provide motivations to obtain certain products or services.

After determining the set of qualifiers 154 associated with the real-world data file 134, virtual-world server 150 may be configured to indicate to the first user 110 in the virtual environment 102 that the real-world data file 134 qualifies the first user 110 to obtain one or more product or services in accordance with the determined qualifiers 154. For example, when a qualifier 154 associated with the real-world data file 134 qualifies the first user 110 to obtain a product for a first amount of data objects (e.g., real-world data objects 136 and/or equivalent virtual data objects 162), virtual-world server 150 indicates to the first user 110 in the virtual environment 102 that the real-world data file 134 qualifies the first user 110 to obtain the product for the first amount of data objects. The indication to the first user 110 in the virtual environment 102 may be made in several ways including, but not limited to, displaying the indication on a virtual display screen within the virtual environment, displaying the indication in a virtual display bubble within the virtual environment, announcing the indication through an audio speaker of the first user device 104, or a combination thereof. In one embodiment, the indication may include, but is not limited to, one or more of a type of the real-world data file 134 associated with the qualifier 154, a privilege status 138 associated with the real-world data file 134, an identify of the real-world data file 134 (e.g., unique identity number or a portion thereof), the product or service associated with the qualifier 154, and an amount of data objects at which the first user 110 can obtain the product or service in accordance with the qualifier 154.

In certain embodiment, the virtual environment 102 may display a virtual area having several virtual stores, wherein each virtual store displays products and/or services provided by an entity that owns and operates the virtual store in exchange for data objects (e.g., real-world data objects 136 and/or equivalent virtual data objects 162). Virtual-world server 150 may allow the first user 110 to navigate the virtual area (e.g., using first avatar 114), visit each virtual store, and view products and/or services provided by the virtual store. Virtual-world server 150 may be configured to indicate to the first user 110 a qualifier 154 associated with a product or service when the first avatar 114 navigates to a region of the virtual environment 102 (e.g., in the vicinity of the displayed product or service within a virtual store) that is used to display the product or service. For example, the virtual-world server 150 may display in a virtual bubble near the product or service displayed at a virtual store that the real-world data file 134 qualifies the first user 110 to obtain the product or service for a first amount of data objects (e.g., real-world data objects 136 and/or equivalent virtual data objects 162). In one embodiment, when the first user 110 is in the vicinity of a product or service displayed at a virtual store in the virtual environment 102, virtual-world server 150 searches the set of qualifiers 154 determined for the first user 110 as described above to determine whether one or more qualifiers 154 exists for the product or service. Upon detecting one or more qualifiers 154 relating to the product or service based on the search, virtual-world server 150 generates an indication of the one or more qualifiers 154 and presents the indication to the first user 110.

Virtual-world server 150 may be configured to indicate to the first user 110 a qualifier 154 associated with a product or service as described above including a first amount of data objects at which the first user 110 qualifies to obtain the product or service, along with an indication of a second amount of respective data objects required to obtain the same product or service by a second user 112 who is not registered with the real-world server 130 and/or the virtual-world server 150 and/or does not have the same type of real-world data file stored at the real-world server 130. As described above, the second amount of data objects is generally higher than the first amount of data objects. A simultaneous indication of the first and second amounts of data objects allows the first user 110 to determine a quality of the motivation associated with the qualifier 154 in real-time and provides a stronger motivation to obtain the product or service.

In certain embodiments, the first user 110 may be eligible for several qualifiers 154 associated with a same product or service, wherein each qualifier 154 is based on a different type or different privilege status 138 of a respective real-world data file 134. In this context, first user 110 may have multiple real-world data files 134 registered and stored at the real-world server 130. Each of the multiple real-world data files 134 be of a different type and/or may be associated with a different privilege status 138. Thus, each real-world data file 134 of the first user 110 may be associated with a different set of qualifiers 154 that is based on the type and/or privilege status 138 of the real-world data file 134. In one embodiment, multiple qualifiers 154 may exist in relation to the same product or service across the different sets of qualifiers 154 determined for the first user 110. For example, a first qualifier 154 associated with a first type of real-world data file 134 of the first user 110 may qualify the first user 110 to obtain a product for a first amount of data objects (e.g., real-world data objects 136 and/or equivalent virtual data objects 162), and a second qualifier 154 associated with a second type of real-world data file 134 of the first user 110 may qualify the first user 110 to obtain the product for a respective second amount of data objects that is different from the first amount of data objects. In an additional or alternative embodiment, the first type of real-world data file 134 is associated with a first privilege status and the second type of real-world data file 134 is associated with a second lower privilege status. This may mean that the first amount of real-world data objects 136 is smaller than the second amount of data objects 136. Virtual-world server 150 may be configured to generate indications for each qualifier 154 associated with the same product or service and present all indications to the first user 110 simultaneously (e.g., in a data bubble close to the displayed product or service) so that the first user 110 can compare the qualifiers 154 real-time and select one the qualifiers 154 as appropriate.

The virtual-world server 150 may be configured to allow the user to select one or more qualifiers 154 indicated to the user as described above in the virtual environment 102. For example, first user 110 may select a first qualifier 154 (e.g., among multiple qualifiers displayed to the first user 110) to obtain a product or service for a first amount of data objects (e.g., real-world data objects 136 and/or equivalent virtual data objects 162) in accordance with the selected first qualifier 154. Upon receiving the selection of the first qualifier 154 to obtain the product or service, virtual-world server 150 may be configured to provide the first user 110 several options to transfer the first amount of data objects to a second data file (e.g., real-world data file or virtual data file) of an entity or another user who provides the requested product or service in the virtual environment 102. For example, virtual-world server 150 may provide the first user 110 a first option to transfer the first amount of real-world data objects 136 to a second real-world data file of the entity. Additionally, virtual-world server 150 may provide the first user 110 a second option to transfer to a second virtual data file of the entity an amount of virtual data objects 162 equivalent to the first amount of real-world data objects 136.

Virtual-world server 150 may be configured to receive a command from the from first user 110 to transfer the first amount of data objects (e.g., real-world data objects 136 and/or equivalent virtual data objects 162) to a respective real-world data file or virtual data file of the entity that provides the product or service in the virtual environment 102. The command may include a selection by the first user 110 of the first option to transfer the real-world data objects 136 from the real-world data file 134 to the second real-world data file of the entity, or a selection by the first user 110 of the second option to transfer an equivalent amount of virtual data objects 162 from the virtual data file 160 to the second virtual data file of the entity.

In response to receiving the selection of the first option, virtual-world server 150 may send a request to the real-world server 130 to transfer the first amount of real-world data objects 136 from the real-world data file 134 of the first user 110 to the second real-world data file of the entity. The request sent to the real-world server 130 may include an identity of the first user 110, an identity of the real-world data file 134, the first amount or real-world data objects 136 to be transferred, and an identity of the second real-world data file. The real-world server 130 may complete the requested transfer in the real-world environment and send a notification to the first user 110 on a real-world user device 104 of the first user (e.g., a smart phone of the first user 110) when the transfer is complete.

In response to receiving the selection of the second option, virtual-world server 150 may determine an amount of virtual data objects 162 equivalent to the first amount of real-world data objects 136 based on a pre-set conversion method. The virtual-world server 150 may transfer the equivalent amount of the virtual data objects 162 from the virtual data file 160 of the first user 110 to the second virtual data file of the entity. One the transfer is completed, virtual-world server 150 may provide an indication to the first user 110 in the virtual environment 102 that the transfer is complete.

Once the transfer of the first data objects (e.g., real-world data objects 136 or virtual data objects 162) is complete, virtual-world server 150 may initiate transfer of the requested product or service to the first user 110. For example, virtual-world server 150 may send a request to the real-world server 130 to initiate mailing of the requested product to a real-world mailing address of the first user 110.

In certain embodiments, when the virtual-world server 150 determines that a second user 112 (e.g., a guest user) that gained access to the virtual-world server 150 using user-credential 152 and entered the virtual environment 102 (e.g., using second avatar 116) is not registered with the real-world server 130 or the virtual-world server 150 (e.g., is a guest user), virtual-world server 150 may be configured to provide the second user 112 with an option to register with the real-world server 130, the virtual-world server 150 or both. Registering with the real-world server 130 may include the second user 112 generating a real-world data file 134 and storing real-world data objects 136 in the real-world data file 134. Registering with the virtual-world server 150 may include generating a virtual data file 160 and storing virtual data objects 162 in the virtual data file 160. Once the second user 112 is registered with the real-world server 130 and/or the virtual-world server 150, second user 112 may be eligible for the same qualifiers 154 the first user 110 is eligible for as described above.

In a banking user case, the disclosed system and methods described in embodiments of the present disclosure provide motivations to a user (e.g., first user 110) to purchase products or services in the virtual environment 102. In this context, the real-world server 130 and the virtual-world server 150 may be owned and/or operated by the bank. The real-world data file 134 may correspond to a real-world bank account of the first user 110 and the real-world data objects 136 may correspond to the real-world funds in the bank account of the first user 110. Similarly, virtual data file 160 may correspond to a digital wallet of the first user 110 and the virtual data objects 162 may correspond to digital currency. Different types of real-world data file 134 may include, but are not limited to, credit card account, debit card account, savings account, and checking account. Privilege status 138 may refer to a privilege status associated with a credit card account such as silver status, gold status, platinum status etc. User profile 132 may include information relating to the bank accounts and digital wallets of the first user and other information relating to a user profile of the user at the bank. Qualifiers 154 may include motivations provided by one or more accounts to the first user 110 to purchase products or services in the virtual environment 102 based on the type of account and/or privilege status associated with the account.

FIG. 3 illustrates a flowchart of an example method 300 for performing data interactions in a virtual environment 102, in accordance with one or more embodiments of the present disclosure. Method 300 may be performed by the virtual-world server 150 shown in FIG. 1.

At operation 302, virtual world server 150 receives a user credential 152 associated with a first user 110, wherein the user credential 152 provides the first user 110 access to a virtual environment 102.

At operation 304, virtual world server 150 authorizes, based on the user credential 152, an avatar (e.g., first avatar 114) of the first user 110 to enter the virtual environment 102.

As described above, virtual-world server 150 may be configured to use a user credential 152 collected from the first user 110, generated by the first user 110 or assigned to the first user 110 during real-world data interactions with the first user 110, to verify identity of the first user 110 in the virtual environment 102. Thus, the user credential 152 provides the first user 110 access to the virtual environment 102. For example, the user credential 152 may be used by the virtual-world server 150 to verify that the first avatar 114 belongs to and is controlled by the first user 110.

In one example, user credential 152 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the user credential 152) as part of registering with the real-world server 130 and use the separate user credential to log into the real-world server 130 and perform real-world data interaction. The first user 110 may separately generate user credential 152 as part of registering with the virtual-world server 150 (e.g., during a real-world data interaction with the real-world server 130). Once the first user 110 has registered with the virtual-world server 150 and generated the user credential 152, the first user 110 may use the user credential 152 to log into the virtual-world server 150 and perform virtual-world data interactions. The user credential 152 of the first user 110 may be associated with the user profile 132 of the first user 110.

At operation 306, virtual world server 150 determines whether the first user 110 is registered with a first entity associated with the virtual environment 102.

As described above, when a user (e.g., first user 110 or second user 112) gains access to the virtual-world server 150 using user-credential 152 and enters the virtual environment 102 (e.g., using first avatar 114 or second avatar 116), virtual-world server 150 may be configured to determine whether the user is registered with an entity that is associated with the virtual-world server 150 and the real-world server 130. In this context, the entity may own and/or operate the real-world server 130 and the virtual-world server 150. Being registered with the entity associated with the virtual-world server 150 and the real-world server 130 may include being registered with the virtual-world server 150, the real-world server 130, or both. As described above, a first user 110 may be registered with the real-world server 130 and maintain a real-world data file 134 at the real-world server 130. Similarly, the first user 110 may be registered with the virtual-world server 150 and maintain a virtual data file 160 at the virtual-world server 150.

The virtual-world server 150 may determine whether the user (e.g., first user 110 or second user 112) is registered with the real-world server 130 and/or the virtual-world server 150 based on user credential 152 the user used to gain access to the virtual-world server 150 and enter the virtual environment 102. For example, the user credential 152 of the user may be associated with a user profile 132 of the user that was created when the user first registered with the real-world server 130 and/or the virtual-world server 150. In an embodiment, virtual-world server 150 checks whether the user credential 152 that was used by the user to enter the virtual environment 102 is associated with a user profile 132 of the user stored at the real-world server 130 and/or at the virtual-world server 150. If a user profile 132 exists, virtual-world server 150 determines that the user is registered with the entity associated with the real-world server 130 and the virtual-world server 150. For example, a first user 110 may enter the virtual environment 102 using user credential 152. In response, virtual-world server 150 may determine that the user credential 152 is associated with user profile 132 of the first user 110 stored at the real-world server 130. In one embodiment, virtual-world server 150 may lookup the real-world server 130 for the user profile 132 associated with the user credential 152 of the first user 110. Upon detecting the user profile 132 of the first user 110 at the real-world server 130, virtual-world server 150 may determine that the first user 110 is registered with the entity that owns and/or operates the real-world server 130 and/or the virtual world server 150.

If the first user 110 is found to be registered with the first entity associated with the virtual environment 102, method 300 proceeds to operation 310 where virtual-world server 150 obtains a user profile 132 of the first user 110 associated with a registration of the first user 110 with the first entity, wherein the user profile 132 comprises information relating to a first type of data file (e.g., real-world data file 134) of the first user that is registered with the first entity. The first type of data file qualifies the first user 110 to obtain a product or service for a first amount of data objects (e.g., real-world data objects 136 and/or equivalent amount of virtual data objects 162), wherein the first amount of data objects is less than a second amount of data objects required to obtain the product or the service by a second user (e.g., second user 112 who does not have the first type of data file registered with the first entity.

As described above, information relating to the real-world data file 134 of the first user 110 may be stored as part of the user profile 132 of the first user 110. This information may include, but is not limited to, an identity (e.g., unique name or number) of the real-world data file 134, amount of real-world data objects 136 stored in the real-world data file 134, a log of data interactions conducted in relation to the real-world data file 134 and any other information relating to the real-world data file 134.

Upon determining that a first user 110 is registered with the real-world server 130 and/or the virtual-world server 150, the virtual-world server 150 may be configured to obtain the user profile 132 of the first user 110 that is associated with the registration of the first user 110 with the real-world server 130 and/or the virtual-world server 150. For example, based on the user credential 152 of the first user 110, virtual-world server 150 may request the real-world server 130 for the user profile 132 associated with the first user 110. In response, real-world server 130 may transmit the user profile 132 of the first user 110 to the virtual-world server 150. The user profile 132 associated with the first user 110 may include information relating to one or more real-world data files 134 of the first user 110 stored at the real-world server 130. The real-world data file 134 of the first user 110 may be of one of a plurality of types of real-world data files. One or more types of real-world data files may qualify the first user 110 to obtain a product or service provided in the virtual environment 102 for a pre-selected amount of data objects (e.g., real-world data objects 136 or equivalent virtual data objects 162). In one embodiment, a particular type of real-world data file 134 of the first user 110 may qualify the first user 110 to obtain a product or service for a first amount of data objects that is less than a second amount of respective data objects required to obtain the same product or service by a second user 112 who is not registered with the real-world server 130 and/or the virtual-world server 150 and/or does not have the same type of real-world data file stored at the real-world server 130. In other words, the virtual-world server 150 provides a motivation in relation to obtaining certain products or services in the virtual environment 102 to users who are registered with the real-world server 130 and have a particular type of real-world data file stored at the real-world server 130. These motivations provided to the user may be referred to as qualifiers 154. Different types of real-world data files 134 may be associated with a different set of qualifiers 154, wherein each qualifier may provide a different motivation to the first user 110 in relation to a product or service in the virtual environment 102. For example, a first type of real-world data file 134 may be associated with a first set of qualifiers that provide a first set of motivations and a second type of real-world data file 134 may be associated with a second set of qualifiers that provide a second set of motivations. In one embodiment, a first qualifier associated with a first type of real-world data file 134 may qualify the first user 110 to obtain a product or service for a first amount of data objects, while a second type of real-world data file 134 may qualify the first user 110 to obtain the same product or service for a second amount of data objects that is less than the first amount of data objects. The motivation provided by a qualifier 154 towards a product or service may be pre-negotiated between a first entity that operates the real-world server 130 and second entity that provides the product or service.

In certain embodiments, one or more types of real-world data files may be associated with different privilege statuses 138. For example, a first type of real-world data file 134 may be associated with a first privilege status 138 and a second type of real-world data file 134 may be associated with a second privilege status 138, wherein the first privilege status 138 may be higher than the second privilege status 138. A privilege status 138 associated with a real-world data file 134 decides a quality of qualifiers 154 and corresponding motivations the first user 110 qualifies for in the virtual-world environment 102, wherein a higher quality of qualifiers 154 and corresponding motivations are associated with a real-world data file 134 having a higher privilege status 138. For example, a first real-world data file 134 of the first user 110 having a first privilege status 138 may be associated with a first qualifier 154 that qualifies the first user 110 to obtain a product or service within the virtual environment 102 for a first amount of data objects (e.g., real-world data objects 136 or virtual data objects 162). On the other hand, a second real-world data file 134 of the first user 110 having a second lower privilege status 138 than the first privilege status may be associated with a second qualifier that qualifies the first user 110 to obtain the same product or same service within the virtual environment 102 for a second amount of data object (e.g., real-world data objects 136 or virtual data objects 162) that is higher than the first amount of data objects. A privilege status 138 may be assigned to a particular real-world data file 134 based on one or more factors including, but not limited to, a length of time the real-world data file 134 has been maintained at the real-world server 130, and amount of real-world data objects 136 stored in the real-world data file 134 and data interaction history associated with the real-world data file 134. For example, the longer the real-world data file 134 has been maintained at the real-world server 130, the higher is the privilege status 138 assigned to the real-world data file 134. In another example, a higher average amount of real-world data objects 136 maintained in the real-world data file 134 results in a higher privilege status 138 being assigned to the real-world data file 134.

In one embodiment, if the first user 110 is not registered with the first entity associated with the virtual environment 102, method 300 proceeds to operation 308 where the first user 110 is provide an option to register with the real-world server 130 and/or the virtual-world server 150.

As described above, when the virtual-world server 150 determines that a second user 112 (e.g., a guest user) that gained access to the virtual-world server 150 using user-credential 152 and entered the virtual environment 102 (e.g., using second avatar 116) is not registered with the real-world server 130 or the virtual-world server 150 (e.g., is a guest user), virtual-world server 150 may be configured to provide the second user 112 with an option to register with the real-world server 130, the virtual-world server 150 or both. Registering with the real-world server 130 may include the second user 112 generating a real-world data file 134 and storing real-world data objects 136 in the real-world data file 134. Registering with the virtual-world server 150 may include generating a virtual data file 160 and storing virtual data objects 162 in the virtual data file 160. Once the second user 112 is registered with the real-world server 130 and/or the virtual-world server 150, second user 112 may be eligible for the same qualifiers 154 the first user 110 is eligible for as described above.

At operation 312, virtual-world server 150 determines the first amount of data objects (e.g., real-world data objects 136 or equivalent amount of virtual data objects 162) the first user 110 qualifies for based on the first type of data file (e.g., real-world data file 134).

As described above, after obtaining the user profile 132 of the first user 110, virtual-world server 150 determines, based on the user profile 132, that the first user 110 has real-world data file 134 registered and stored at the real-world server 130 and further determines the type and/or privilege status 138 of the real-world data file 134. Based on the determined type of the real-world data file 134 and/or the privilege status 138 of the particular type of the real-world data file 134, virtual-world server 150 determines a set of qualifiers 154 associated with the real-world data file 134 that provide motivations to obtain certain products or services.

At operation 314, virtual-world server 150 indicates to the first user 110 in the virtual environment 102 that the first type of data file (e.g., real-world data file 134) qualifies the first user 110 to obtain the product or service for the first amount of data objects.

As described above, after determining the set of qualifiers 154 associated with the real-world data file 134, virtual-world server 150 may be configured to indicate to the first user 110 in the virtual environment 102 that the real-world data file 134 qualifies the first user 110 to obtain one or more product or services in accordance with the determined qualifiers 154. For example, when a qualifier 154 associated with the real-world data file 134 qualifies the first user 110 to obtain a product for a first amount of data objects (e.g., real-world data objects 136 and/or equivalent virtual data objects 162), virtual-world server 150 indicates to the first user 110 in the virtual environment 102 that the real-world data file 134 qualifies the first user 110 to obtain the product for the first amount of data objects. The indication to the first user 110 in the virtual environment 102 may be made in several ways including, but not limited to, displaying the indication on a virtual display screen within the virtual environment, displaying the indication in a virtual display bubble within the virtual environment, announcing the indication through an audio speaker of the first user device 104, or a combination thereof. In one embodiment, the indication may include, but is not limited to, one or more of a type of the real-world data file 134 associated with the qualifier 154, a privilege status 138 associated with the real-world data file 134, an identify of the real-world data file 134 (e.g., unique identity number or a portion thereof), the product or service associated with the qualifier 154, and an amount of data objects at which the first user 110 can obtain the product or service in accordance with the qualifier 154.

In certain embodiment, the virtual environment 102 may display a virtual area having several virtual stores, wherein each virtual store displays products and/or services provided by an entity that owns and operates the virtual store in exchange for data objects (e.g., real-world data objects 136 and/or equivalent virtual data objects 162). Virtual-world server 150 may allow the first user 110 to navigate the virtual area (e.g., using first avatar 114), visit each virtual store, and view products and/or services provided by the virtual store. Virtual-world server 150 may be configured to indicate to the first user 110 a qualifier 154 associated with a product or service when the first avatar 114 navigates to a region of the virtual environment 102 (e.g., in the vicinity of the displayed product or service within a virtual store) that is used to display the product or service. For example, the virtual-world server 150 may display in a virtual bubble near the product or service displayed at a virtual store that the real-world data file 134 qualifies the first user 110 to obtain the product or service for a first amount of data objects (e.g., real-world data objects 136 and/or equivalent virtual data objects 162). In one embodiment, when the first user 110 is in the vicinity of a product or service displayed at a virtual store in the virtual environment 102, virtual-world server 150 searches the set of qualifiers 154 determined for the first user 110 as described above to determine whether one or more qualifiers 154 exists for the product or service. Upon detecting one or more qualifiers 154 relating to the product or service based on the search, virtual-world server 150 generates an indication of the one or more qualifiers 154 and presents the indication to the first user 110.

Virtual-world server 150 may be configured to indicate to the first user 110 a qualifier 154 associated with a product or service as described above including a first amount of data objects at which the first user 110 qualifies to obtain the product or service, along with an indication of a second amount of respective data objects required to obtain the same product or service by a second user 112 who is not registered with the real-world server 130 and/or the virtual-world server 150 and/or does not have the same type of real-world data file stored at the real-world server 130. As described above, the second amount of data objects is generally higher than the first amount of data objects. A simultaneous indication of the first and second amounts of data objects allows the first user 110 to determine a quality of the motivation associated with the qualifier 154 in real-time and provides a stronger motivation to obtain the product or service.

In certain embodiments, the first user 110 may be eligible for several qualifiers 154 associated with a same product or service, wherein each qualifier 154 is based on a different type or different privilege status 138 of a respective real-world data file 134. In this context, first user 110 may have multiple real-world data files 134 registered and stored at the real-world server 130. Each of the multiple real-world data files 134 be of a different type and/or may be associated with a different privilege status 138. Thus, each real-world data file 134 of the first user 110 may be associated with a different set of qualifiers 154 that is based on the type and/or privilege status 138 of the real-world data file 134. In one embodiment, multiple qualifiers 154 may exist in relation to the same product or service across the different sets of qualifiers 154 determined for the first user 110. For example, a first qualifier 154 associated with a first type of real-world data file 134 of the first user 110 may qualify the first user 110 to obtain a product for a first amount of data objects (e.g., real-world data objects 136 and/or equivalent virtual data objects 162), and a second qualifier 154 associated with a second type of real-world data file 134 of the first user 110 may qualify the first user 110 to obtain the product for a respective second amount of data objects that is different from the first amount of data objects. In an additional or alternative embodiment, the first type of real-world data file 134 is associated with a first privilege status and the second type of real-world data file 134 is associated with a second lower privilege status. This may mean that the first amount of real-world data objects 136 is smaller than the second amount of data objects 136. Virtual-world server 150 may be configured to generate indications for each qualifier 154 associated with the same product or service and present all indications to the first user 110 simultaneously (e.g., in a data bubble close to the displayed product or service) so that the first user 110 can compare the qualifiers 154 real-time and select one the qualifiers 154 as appropriate.

At operation 316, virtual-world server 150 receives a selection of the product or service, wherein the selection is made by the first user 110 in the virtual environment 102.

As described above, virtual-world server 150 may be configured to allow the user to select one or more qualifiers 154 indicated to the user as described above in the virtual environment 102. For example, first user 110 may select a first qualifier 154 (e.g., among multiple qualifiers displayed to the first user 110) to obtain a product or service for a first amount of data objects (e.g., real-world data objects 136 and/or equivalent virtual data objects 162) in accordance with the selected first qualifier 154. Upon receiving the selection of the first qualifier 154 to obtain the product or service, virtual-world server 150 may be configured to provide the first user 110 several options to transfer the first amount of data objects to a second data file (e.g., real-world data file or virtual data file) of an entity or another user who provides the requested product or service in the virtual environment 102. For example, virtual-world server 150 may provide the first user 110 a first option to transfer the first amount of real-world data objects 136 to a second real-world data file of the entity. Additionally, virtual-world server 150 may provide the first user 110 a second option to transfer to a second virtual data file of the entity an amount of virtual data objects 162 equivalent to the first amount of real-world data objects 136.

At operation 318, virtual-world server 150 receives a command from the first user 110 to transfer the first amount of data objects (e.g., real-world data objects 136 or equivalent amount of virtual data objects 162) from the first type of data file (e.g., real-world data file 134 or virtual data file 160) of the first user 110 to a second data file associated with a second entity that provides the product or service.

As described above, virtual-world server 150 may be configured to receive a command from the from first user 110 to transfer the first amount of data objects (e.g., real-world data objects 136 and/or equivalent virtual data objects 162) to a respective real-world data file or virtual data file of the entity that provides the product or service in the virtual environment 102. The command may include a selection by the first user 110 of the first option to transfer the real-world data objects 136 from the real-world data file 134 to the second real-world data file of the entity, or a selection by the first user 110 of the second option to transfer an equivalent amount of virtual data objects 162 from the virtual data file 160 to the second virtual data file of the entity.

At operation 320, in response to receiving the command to transfer the first amount of data objects, virtual-world server 150 transfers the first amount of data objects from the first type of data file of the first user 110 to the second data file, to cause a transfer of the product or service to the first user 110 in a real-world environment.

As described above, in response to receiving the selection of the first option, virtual-world server 150 may send a request to the real-world server 130 to transfer the first amount of real-world data objects 136 from the real-world data file 134 of the first user 110 to the second real-world data file of the entity. The request sent to the real-world server 130 may include an identity of the first user 110, an identity of the real-world data file 134, the first amount or real-world data objects 136 to be transferred, and an identity of the second real-world data file. The real-world server 130 may complete the requested transfer in the real-world environment and send a notification to the first user 110 on a real-world user device 104 of the first user (e.g., a smart phone of the first user 110) when the transfer is complete.

In response to receiving the selection of the second option, virtual-world server 150 may determine an amount of virtual data objects 162 equivalent to the first amount of real-world data objects 136 based on a pre-set conversion method. The virtual-world server 150 may transfer the equivalent amount of the virtual data objects 162 from the virtual data file 160 of the first user 110 to the second virtual data file of the entity. One the transfer is completed, virtual-world server 150 may provide an indication to the first user 110 in the virtual environment 102 that the transfer is complete.

Once the transfer of the first data objects (e.g., real-world data objects 136 or virtual data objects 162) is complete, virtual-world server 150 may initiate transfer of the requested product or service to the first user 110. For example, virtual-world server 150 may send a request to the real-world server 130 to initiate mailing of the requested product to a real-world mailing address of the first user 110.

Figure 4:
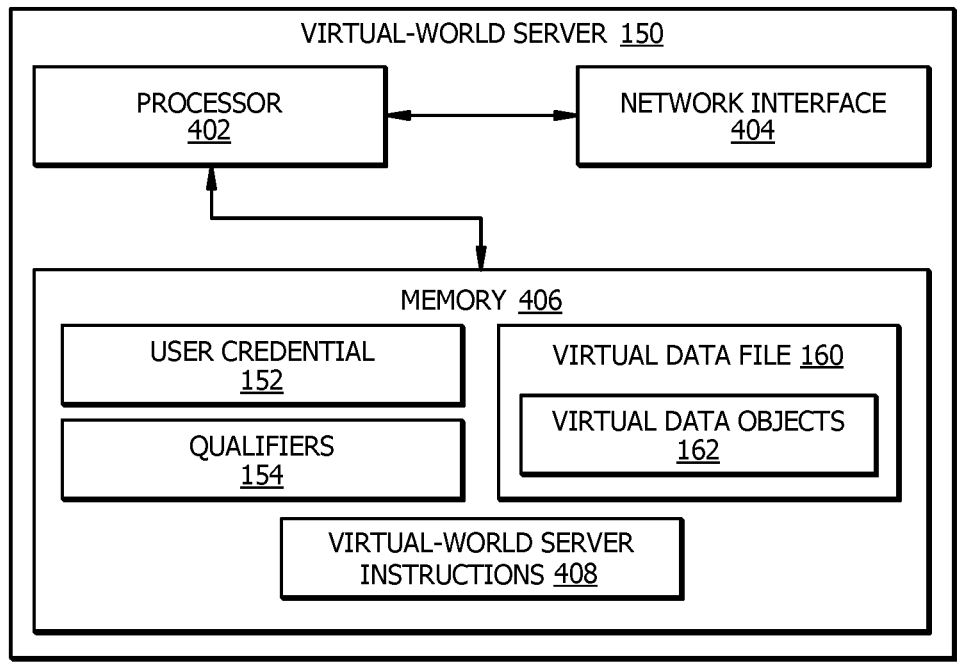
FIG. 4 illustrates an example schematic diagram of the virtual-world server shown in FIG. 1, in accordance with one or more aspects of the present disclosure.

FIG. 4 illustrates an example schematic diagram 400 of the virtual-world server 150 shown in FIG. 1, in accordance with one or more aspects of the present disclosure.

The virtual-world server 150 comprises a processor 402, a memory 406, and a network interface 404. The virtual-world server 150 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 408) to implement the virtual-world server 150. In this way, processor 402 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIG. 3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the user credential 152, qualifiers 154, virtual data file 160, virtual data objects 162, and the virtual-world server instructions 408. The virtual-world server instructions 408 may include any suitable set of instructions, logic, rules, or code operable to execute the virtual-world server 150.

The network interface 404 is configured to enable wired and/or wireless communications. The network interface 404 is configured to communicate data between the virtual-world server 150 and other devices, systems, or domains (e.g. user devices 104 and 106 and the real-world server 130). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

Figure 5:
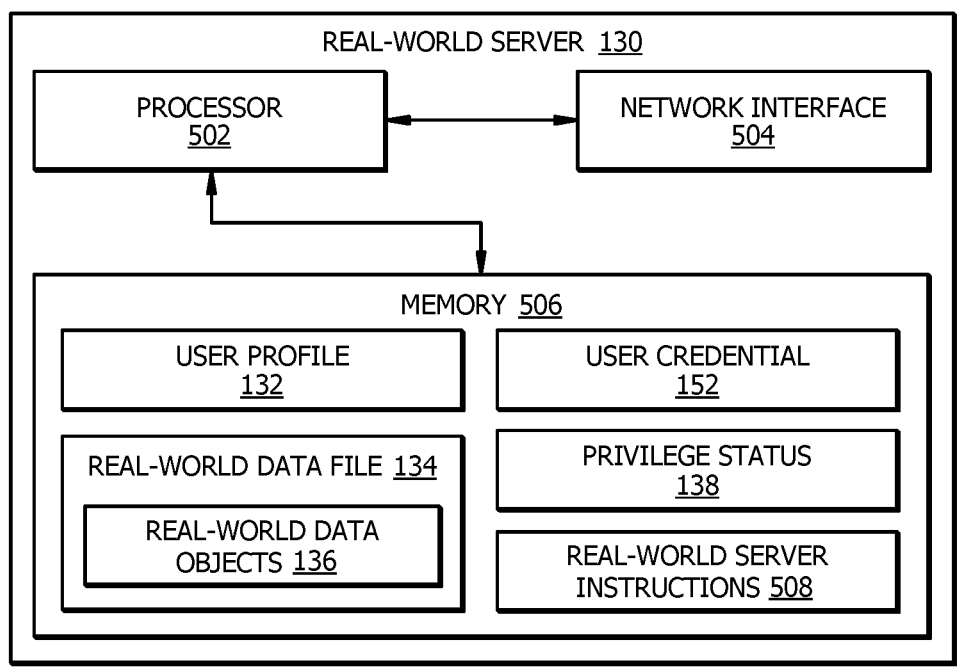
FIG. 5 illustrates an example schematic diagram of the real-world server shown in FIG. 1, in accordance with one or more aspects of the present disclosure.

FIG. 5 illustrates an example schematic diagram 500 of the real-world server 130 shown in FIG. 1, in accordance with one or more aspects of the present disclosure.

The real-world server 130 comprises a processor 502, a memory 506, and a network interface 504. The real-world server 130 may be configured as shown in FIG. or in any other suitable configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 508) to implement the real-world server 130. In this way, processor 502 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1 and 3. For example, the processor 502 may be configured to perform at least a portion of the method 300 as described in FIG. 3.

The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise a read-only memory (ROM), random-access memory (RAM), ternary content-addressable memory (TCAM), dynamic random-access memory (DRAM), and static random-access memory (SRAM).

The memory 506 is operable to store information relating to user profile 132, real-world data file 134, real-world data objects 136, user credential 152, privilege status 138 and the real-world server instructions 508. The real-world server instructions 508 may include any suitable set of instructions, logic, rules, or code operable to execute the real-world server 130.

The network interface 504 is configured to enable wired and/or wireless communications. The network interface 504 is configured to communicate data between the real-world server 130 and other devices, systems, or domains (e.g. user devices 104 and 106 and the virtual-world server 150). For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory that stores a user credential associated with a first user; and
   at least one processor coupled to the memory, and configured to:
   receive the user credential associated with the first user, wherein the user credential provides the first user access to a virtual environment;
   authorize, based on the user credential, an avatar of the first user to enter the virtual environment;
   determine whether the first user is registered with a first entity associated with the virtual environment;
   if the first user is registered with the first entity, obtain a user profile of the first user associated with a registration of the first user with the first entity, wherein the user profile comprises information relating to a first type of data file of the first user that is registered with the first entity, wherein:
   the first type of data file qualifies the first user to obtain a product or service for a first amount of data objects; and
   the first amount of data objects is less than a second amount of data objects required to obtain the product or the service by a second user who does not have the first type of data file registered with the first entity;
   determine the first amount of data objects the first user qualifies for based on the first type of data file;
   indicate to the first user in the virtual environment that the first type of data file qualifies the first user to obtain the product or service for the first amount of data objects;
   receive a selection of the product or service, wherein the selection is made by the first user in the virtual environment;
   receive a command from the first user to transfer the first amount of data objects from the first type of data file of the first user to a second data file associated with a second entity that provides the product or service; and
   in response to receiving the command, transfer the first amount of data objects from the first type of data file of the first user to the second data file, to cause a transfer of the product or service to the first user in a real-world environment.

2. The system of claim 1, wherein:
   the user profile further comprises information relating to a second type of data file of the first user that is registered with the first entity;
   the second type of data file qualifies the first user to obtain the product or service for a third amount of data objects, wherein the third amount is different from the first amount;
   the at least one processor is further configured to:
   determine the third amount of data objects the first user qualifies for based on the second type of data file; and
   indicate to the first user in the virtual environment that the second type of data file qualifies the first user to obtain the product or service for the third amount of data objects; and
   the selection of the product or service comprises a selection by the user of the first amount of data types associated with the first type of data file.

3. The system of claim 1, wherein the at least one processor is further configured to indicate to the first user, along with the first amount of data objects, the second amount of data objects required to obtain the product or the service by a second user who does not have the first type of data file registered with the first entity.

4. The system of claim 1, wherein the at least one processor is configured to indicate to the first user in the virtual environment that the first type of data file qualifies the first user to obtain the product or service for the first amount of data objects when the avatar of the user navigates to a region of the virtual environment that is used by the second entity to show the product or entity to the first user.

5. The system of claim 1, wherein the at least one processor is further configured to:
   provide the first user in the virtual environment:
   a first option to transfer the first amount of data objects from the first type of data file in the virtual environment; and
   a second option to transfer the first amount of data objects from the first type of data file in the real-world environment.

6. The system of claim 2, wherein:
   the first type of data file is associated with a higher privilege status as compared to the second type of data file; and
   the first type of data file, based on a higher privilege status compared to the second type of data file, qualifies the first user to obtain the product or service for the first amount of data objects that is lower than the second amount of data objects.

7. The system of claim 5, wherein:
   the command from the first user to transfer the first amount of data objects from the first type of data file comprises a selection by the first user of the first option;
   the at least one processor is further configured to:
   transfer a first amount of virtual data objects from a virtual data file of the first user to the second data file, wherein the first amount of the virtual data objects is equivalent to the first amount of data objects;
   detect that the transfer of the first amount of virtual data objects has been completed; and
   in response, indicate to the first user in the virtual environment that the transfer has been completed.

8. The system of claim 5, wherein:
   the command from the first user to transfer the first amount of data objects from the first type of data file comprises a selection by the first user of the second option;
   the first type of data file is a real-world data file, and the first amount of data objects comprises real-world data objects;
   the at least one processor is further configured to:
   detect that the transfer of the first amount of real-world data objects has been completed; and in response, send a notification to the first user in the real-world environment on a real-world user device that the transfer has been completed.

9. A method for performing data interactions, comprising:
receiving a user credential associated with the first user, wherein the user credential provides the first user access to a virtual environment;
authorizing, based on the user credential, an avatar of the first user to enter the virtual environment;
determining whether the first user is registered with a first entity associated with the virtual environment;
if the first user is registered with the first entity, obtaining a user profile of the first user associated with a registration of the first user with the first entity, wherein the user profile comprises information relating to a first type of data file of the first user that is registered with the first entity, wherein:
the first type of data file qualifies the first user to obtain a product or service for a first amount of data objects; and
the first amount of data objects is less than a second amount of data objects required to obtain the product or the service by a second user who does not have the first type of data file registered with the first entity;
determining the first amount of data objects the first user qualifies for based on the first type of data file;
indicating to the first user in the virtual environment that the first type of data file qualifies the first user to obtain the product or service for the first amount of data objects;
receiving a selection of the product or service, wherein the selection is made by the first user in the virtual environment;
receiving a command from the first user to transfer the first amount of data objects from the first type of data file of the first user to a second data file associated with a second entity that provides the product or service; and
in response to receiving the command, transferring the first amount of data objects from the first type of data file of the first user to the second data file, to cause a transfer of the product or service to the first user in a real-world environment.

10. The method of claim 9, wherein:
the user profile further comprises information relating to a second type of data file of the first user that is registered with the first entity;
the second type of data file qualifies the first user to obtain the product or service for a third amount of data objects, wherein the third amount is different from the first amount;
further comprising:
determining the third amount of data objects the first user qualifies for based on the second type of data file; and
indicating to the first user in the virtual environment that the second type of data file qualifies the first user to obtain the product or service for the third amount of data objects; and
the selection of the product or service comprises a selection by the user of the first amount of data types associated with the first type of data file.

11. The method of claim 9, further comprising indicating to the first user, along with the first amount of data objects, the second amount of data objects required to obtain the product or the service by a second user who does not have the first type of data file registered with the first entity.

12. The method of claim 9, further comprising indicating to the first user in the virtual environment that the first type of data file qualifies the first user to obtain the product or service for the first amount of data objects when the avatar of the user navigates to a region of the virtual environment that is used by the second entity to show the product or entity to the first user.

13. The method of claim 9, further comprising:
providing the first user in the virtual environment:
a first option to transfer the first amount of data objects from the first type of data file in the virtual environment; and
a second option to transfer the first amount of data objects from the first type of data file in the real-world environment.

14. The method of claim 10, wherein:
the first type of data file is associated with a higher privilege status as compared to the second type of data file; and
the first type of data file, based on a higher privilege status compared to the second type of data file, qualifies the first user to obtain the product or service for the first amount of data objects that is lower than the second amount of data objects.

15. The method of claim 13, wherein:
the command from the first user to transfer the first amount of data objects from the first type of data file comprises a selection by the first user of the first option;
further comprising:
transferring a first amount of virtual data objects from a virtual data file of the first user to the second data file, wherein the first amount of the virtual data objects is equivalent to the first amount of data objects;
detecting that the transfer of the first amount of virtual data objects has been completed; and
in response, indicating to the first user in the virtual environment that the transfer has been completed.

16. The method of claim 13, wherein:
the command from the first user to transfer the first amount of data objects from the first type of data file comprises a selection by the first user of the second option;
the first type of data file is a real-world data file, and the first amount of data objects comprises real-world data objects;
further comprising:
detecting that the transfer of the first amount of real-world data objects has been completed; and
in response, sending a notification to the first user in the real-world environment on a real-world user device that the transfer has been completed.

17. A non-transitory computer-readable medium that stores instructions which, when executed by a processor, cause the processor to:
receive a user credential associated with the first user, wherein the user credential provides the first user access to a virtual environment;
authorize, based on the user credential, an avatar of the first user to enter the virtual environment;
determine whether the first user is registered with a first entity associated with the virtual environment;
if the first user is registered with the first entity, obtain a user profile of the first user associated with a registration of the first user with the first entity, wherein the user profile comprises information relating to a first type of data file of the first user that is registered with the first entity, wherein:
the first type of data file qualifies the first user to obtain a product or service for a first amount of data objects; and
the first amount of data objects is less than a second amount of data objects required to obtain the product or the service by a second user who does not have the first type of data file registered with the first entity;
determine the first amount of data objects the first user qualifies for based on the first type of data file;
indicate to the first user in the virtual environment that the first type of data file qualifies the first user to obtain the product or service for the first amount of data objects;
receive a selection of the product or service, wherein the selection is made by the first user in the virtual environment;
receive a command from the first user to transfer the first amount of data objects from the first type of data file of the first user to a second data file associated with a second entity that provides the product or service; and
in response to receiving the command, transfer the first amount of data objects from the first type of data file of the first user to the second data file, to cause a transfer of the product or service to the first user in a real-world environment.

18. The non-transitory computer-readable medium of claim 17, wherein:
the user profile further comprises information relating to a second type of data file of the first user that is registered with the first entity;
the second type of data file qualifies the first user to obtain the product or service for a third amount of data objects, wherein the third amount is different from the first amount;
wherein the instructions further cause the processor to:
determine the third amount of data objects the first user qualifies for based on the second type of data file; and
indicate to the first user in the virtual environment that the second type of data file qualifies the first user to obtain the product or service for the third amount of data objects; and
the selection of the product or service comprises a selection by the user of the first amount of data types associated with the first type of data file.

19. The non-transitory computer-readable medium of claim 17, wherein the instructions further cause the processor to indicate to the first user, along with the first amount of data objects, the second amount of data objects required to obtain the product or the service by a second user who does not have the first type of data file registered with the first entity.

20. The non-transitory computer-readable medium of claim 18, wherein:
the first type of data file is associated with a higher privilege status as compared to the second type of data file; and
the first type of data file, based on a higher privilege status compared to the second type of data file, qualifies the first user to obtain the product or service for the first amount of data objects that is lower than the second amount of data objects.

* * * * *